May 11, 1954
J. C. ANDREINI
2,677,854
CURING BAG WITH DRAINER
Filed Nov. 29, 1950
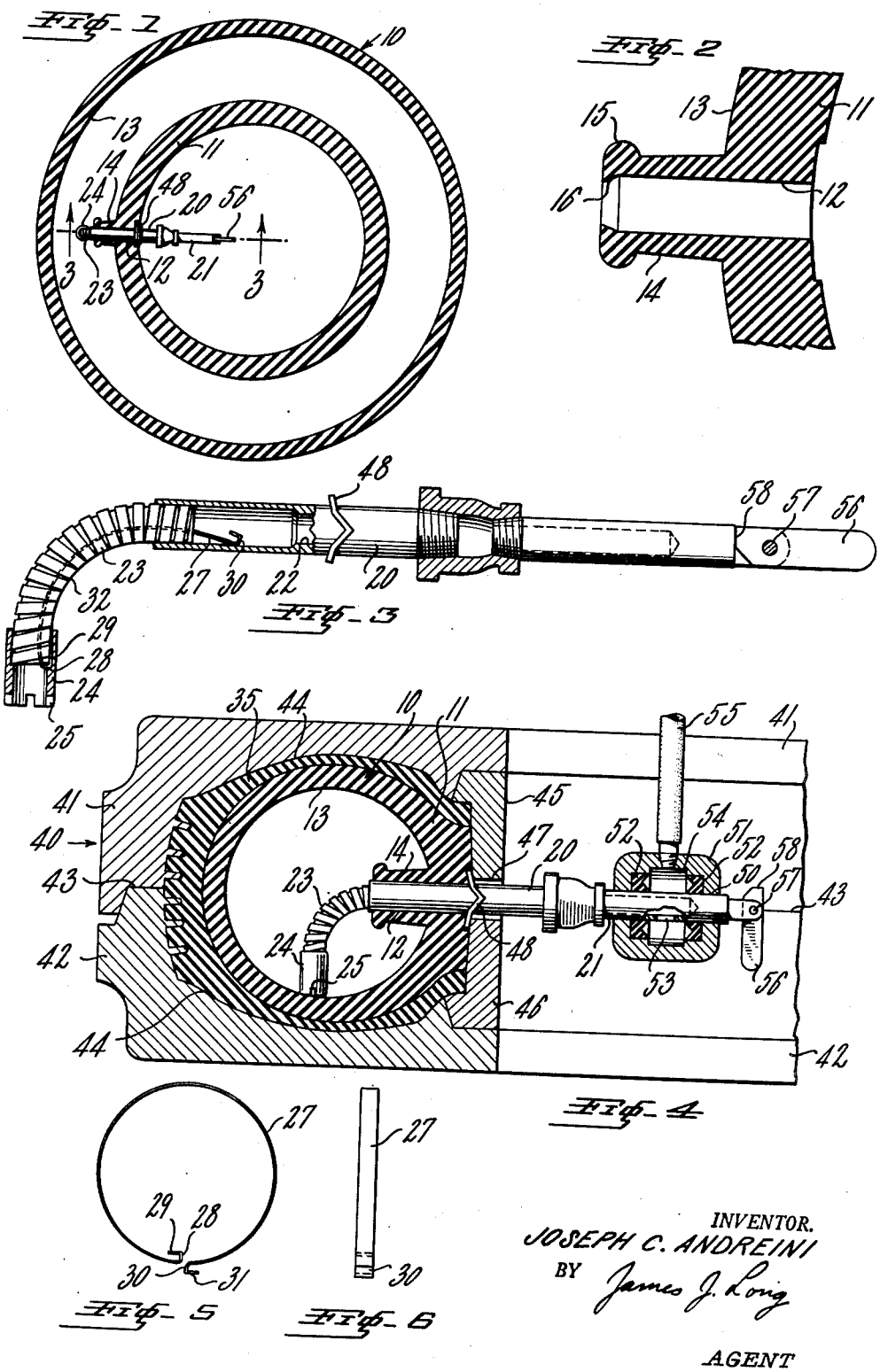
INVENTOR.
JOSEPH C. ANDREINI
BY James J. Long
AGENT Patented May 11, 1954

2,677,854

UNITED STATES PATENT OFFICE 2,677,854

CURING BAG WITH DRAINER

Joseph C. Andreini, Detroit, Mich., assignor to United States Rubber Company, New York, N. Y., a corporation of New Jersey Application November 29, 1950, Serial No. 198,135

4 Claims. (Cl. 18—45)

This invention relates to pneumatic tire shaping and vulcanizing apparatus and more particularly it relates to an improved curing bag drainer.

In the manufacture of pneumatic tires, it is conventional practice first to assemble the component parts of the tire, such as the inextensible bead elements, the carcass portion and the tread and side wall portions, in band form, on a building drum, and thereafter to shape the raw tire band by inserting therein a curing bag, which is a hollow toroidal form having relatively thick walls of heat-resistant, extensible, resilient material, usually made of a natural rubber composition or of a synthetic rubber, such as butyl rubber. The curing bag has one or more inlets for introduction of fluid shaping and heating media under pressure, such as air, hot water, or steam, and such fluid media are used to apply internal pressure to expand the bag against the tire and to make the latter conform to the shape of the heated mold in which the tire is vulcanized, as well as to heat the tire internally to effect more rapid and more uniform vulcanization. After the tire is vulcanized, the curing bag is removed from the finished tire and inserted in another raw tire as before, and in this way the curing bag is used repeatedly until it deteriorates from repeated exposure to vulcanizing conditions.

When hot water is used as the fluid heating medium within the curing bag it is necessary to provide for drainage of the water out of the bag at the conclusion of the vulcanization. Such drainage of the bag must be substantially complete, because any hot water which remains in the bag may be ejected from the curing bag inlet as the bag is being removed from the vulcanized tire, causing injury to the workman who is performing this operation. Also, any remaining water may be spilled as the bag is inserted in the next raw tire, and if such spilled water gets between the bag and the tire carcass, it will result in formation of a defective tire. In addition, water remaining in the bag eventually cools down, and the presence of such cold water may seriously retard the cure of the tire in which the bag is subsequently inserted.

The curing bag draining means heretofore in use have not been entirely satisfactory for various reasons; for example, they have not always performed effectively, or they have not been convenient to use. Particular difficulty in effecting proper drainage has been experienced with curing bags of relatively small diameter, such as are used for curing the passenger car size tire, since such tires do not readily accommodate the usual draining devices, especially if it is desired to use a removable type of draining device. Also, particular difficulty is experienced in draining curing bags having only a single inlet, such as are commonly employed in the type of vulcanizer known as the pot heater.

Accordingly, the present invention is directed to a curing bag assembly incorporating a novel and improved draining means which insures that all of the water will be removed from the curing bag, and which is convenient to use.

Another object of the invention is to provide a curing bag with draining means which has long life and does not cause injury to the bag.

Still a further object is the provision of a draining means which is easily inserted in and removed from the curing bag.

It is also an object of the invention to provide a draining means which functions as a means for introduction of fluid heating media into the bag.

Still another object of the invention is the provision of a removable draining means which is adapted to use with curing bags having but a single inlet.

A further object is to provide a curing bag drainer which can be employed conveniently and effectively with relatively small curing bags.

The manner in which these and other objects and advantages are accomplished by the invention will be made evident in the following detailed description, which is intended to be read with reference to the accompanying drawing, wherein, Fig. 1 is a plan view, in section, of a curing bag incorporating a draining device of the invention;

Fig. 2 is a fragmentary sectional view on a larger scale showing the means on the curing bag for accommodating the draining device;

Fig. 3 is an elevational view on a larger scale of the insertable draining device removed from the curing bag, taken partly in section along the line 3—3 of Fig. 1, and with parts broken away;

Fig. 4 is a transverse fragmentary sectional view of the curing bag and draining device assembled with a pneumatic tire casing in a vulcanizing mold; and Figs. 5 and 6 are front and side views of a strip spring which is incorporated in the draining device.

The invention contemplates provision of a curing bag having a resilient stem extending into its interior and adapted to receive a sliding insertable drainer tube and form a fluid tight seal therewith. The drainer tube has a flexible portion which is provided with spring means for directing the inner end of the tube into the lowest point in the curing bag cavity, thereby insuring that all the water will be displaced from the bag when a gaseous medium is introduced into the bag under pressure for this purpose.

Referring to the drawing, and in particular to Fig. 1, the curing bag 10 shown comprises an annular toroidal inflatable tube somewhat similar to an inner tube which is adapted to be placed inside a pneumatic tire casing for the purpose of shaping the tire and causing the tire to conform to the walls of the mold cavity in which it is vulcanized. The bag 10 is made of extensible, resilient material, preferably a synthetic rubber of the type that is highly resistant to the deteriorating effects of repeated exposure to vulcanizing temperatures. Butyl rubber, that is, a rubbery copolymer of isobutylene with a conjugated 1,3-diene, such as butadiene or isoprene, is especially suitable for this purpose because of its resistance to "reversion," or over-cure upon repeated exposure to high temperatures, as well as its resistance to oxidation and its dimensional stability at elevated temperature.

At its inner diameter or rim area 11, the wall of the bag is relatively thick and, as shown most clearly in Fig. 4, is so shaped as to maintain the beads of the tire casing with which it is associated in proper contact with the tire mold parts during vulcanization.

For the purpose of introducing a fluid expanding medium under pressure and for accommodating the drainage means, there is provided an inlet passageway 12 through the rim wall 11 of the bag. Extending into the interior cavity 13 of the bag there is provided a stem or projection 14 having a longitudinal passageway forming a continuation of the inlet passageway 12. This stem is also made of extensible resilient material, and is usually made of the same material as the bag itself, and is integrally united to the bag body, suitably by compression molding, as is disclosed in copending application of Jake Hengeveld, Serial No. 67,430, now abandoned, filed December 27, 1948, and assigned to the same assignee as the instant invention. The wall of the stem 14 is relatively thick at its base where it is integral with the curing bag wall, and tapers inwardly to a lesser thickness toward the tip of the stem. The end or tip of the stem 14 is provided on its outer surface with a radially outwardly extending thickened rim or lip 15 (Fig. 2) for the purpose of reinforcing the stem at this point, thereby preventing the stem from enlarging upon continued use and thereby increasing the useful service life of the bag. The interior tip of the stem is provided with a radially inwardly extending rim or lip 16 (Fig. 2), so that the stem will more securely grip in fluid sealing engagement the slidable connecting tube 20 which is insertable in the inlet passage 12.

The connecting insert tube 20 is a rigid tube, such as a steel tube, and has an outside diameter such that it slides snugly within the passage 12, in fluid sealing engagement with the wall thereof, even though there is no adhesive bond between the tube and the wall of the passage, and the tube may be inserted into and removed from such passage by hand. The outer end of the insert tube 20 is provided with an adapter tube portion 21 which is adapted to be connected to a suitable source of heating or shaping fluid media, or to a drainage line in a manner to be described below. The internal bore 22 (Fig. 3) of the insert tube 20 is enlarged over its inner portion to receive the end of a flexible metal hose or tube 23 which may be soldered in place at the end of the tube 20. The flexible hose 23 is preferably made of suitable corrosion-resistant material, such as stainless steel. It is a spring-like structure of conventional construction made of a spirally wound strip having edges which are slidably interlocked in such manner as to permit slight relative movement of adjacent turns of the spiral, so that the hose may be bent through a limited arc. The maximum angular extent of the arc which a given length of the hose can describe is limited by the fact that the adjacent turns of the spiral comprising the hose bear up against each other on the inner radius of the arc, preventing further curvature. The inner terminal end of the metal hose 23 is provided with a tip 24 having an external diameter such that it is slidable through the bore 12 of the resilient stem 14. The end of the hose 23 is fitted into the internal bore of the tip 24 and is secured thereto, as by crimping. The tip 24 may be made of suitable corrosion-resisting material, such as bronze. The terminal face of the tip is provided with radial slots 25 to permit passage of fluid when the end face of the tip bears against the wall of the curing bag.

In order to cause the flexible hose 23 to assume a downward curvature and insure that the tip 24 will be forcibly directed to the lowest point in the curing bag cavity when the bag is disposed in a generally horizontal position in the tire vulcanizing apparatus, the flexible tube is spring loaded. To this end there is provided within the bore of the flexible hose, a strip 27 of spring material, which extends the length of the hose 23. The strip spring 27, as shown in Figs. 5 and 6, is so constructed as to assume a circular shape when free, and at one end it is bent inwardly of the circle in the form of a hook 28, and terminates in a flat portion 29, while the other end is bent in the form of a hook 30, extending outwardly from the circle, and terminates in a flat portion 31. In assembly, one hooked end 28 of the spring is disposed over the terminal inner end of the hose 23, and the tip member 24 is applied thereover binding the flat portion 29 firmly in place between the outer surface of the hose 23 and the inner surface of the tip 24. The remaining hooked end 30 of the spring 27 extends freely into the bore 22 of the insert tube 20, where it can slide back and forth without binding as the spring straightens out when passing the hose 23 through the passage 12.

The arrangement is such that the spring 27, in trying to assume its normal curvature, forces the flexible hose 23 to assume an arcuate form, as indicated in Figs. 3 and 4. The hose 23 is bent by the spring 27 as far as the hose is capable of bending, that is, the hose is bent until the adjacent turns of the spiral metal strip of which the hose is constructed touch each other at the inner radius of the bent hose, as indicated at 32 in Fig. 3. The length of the hose 23 is such that when it is bent as far as it can be by the internal spring 27, the tip of the hose 24 will extend to the substantially lowest point in the curing bag. In the usual vulcanizing apparatus the curing bag will be disposed in a generally horizontal position, that is, with the major plane of the bag in either a horizontal plane or at an acute angle to the horizontal. Therefore, the tube 23 will usually be of such length that when it is bent to its full extent it describes an arc of substantially 90° so that the tip 24 extends to essentially the lowermost point in the bag.

In Fig. 4, the bag 10 is shown in place within a raw tire casing 35 which has previously been built in the form of an annular band on the usual tire building drum, and shaped into annular toroidal form with the aid of a vacuum shaping box, wherein the bag 10 is inserted in the casing 35 and inflated with air, all in accordance with conventional practice. The curing bag and tire casing are shown in place in a horizontal position in a vulcanizing mold 40. The mold 40 comprises upper and lower mating mold halves 41 and 42, separable at the parting line 43. The mold halves 41, 42 together form a horizontal annular toroidal cavity 44 having the proper shape for accommodating the tire. The assembly includes annular toe rings 45, 46 which in cooperation with the curing bag and the mold halves 41, 42 aid in maintaining the beads of the tire casing in place, and aid in imparting the desired shape thereto. It will be understood that the mold halves 41, 42 are intended to be enclosed in a suitable vulcanizing chamber, such as the type of vulcanizing apparatus known as the pot heater, though other types of vulcanizing equipment may be used.

Recesses in the marginal opposing edges of the toe rings 44, 45 define a port 47 through which the insert tube 20 extends freely. A transverse plate 48 secured to the insert tube engages the inner surface of the toe rings so as to cover the port 47, and prevents the curing bag rim wall, which becomes relatively soft at vulcanizing temperatures, from being displaced outwardly through the port 47 in the toe rings under the influence of the internal pressure in the bag.

When the assembly is enclosed in the mold 40, the outwardly projecting adapter tube portion 21 of the insert tube assembly is adapted to slide through a passageway 50 in a manifold coupling member 51. A fluid tight seal is maintained between the coupling 51 and adapter tube 21 by spaced annular resilient gaskets 52 surrounding the tube 21 within the coupling 51. The passageway 22 within the insert tube 20 leads to a radial inlet hole 53 through the wall of the adapter tube 21 which communicates with an interior chamber 54 of the coupling 51. A hose 55 serves to connect the chamber 54 to a manifold (not shown) which is arranged to be connected as desired to a hot water supply or to a steam or air supply, or to a drain line.

The end of the adapter tube 21 extending out of the coupling 51 is closed off, and carries a swinging latch member 56 attached to a fork on the end of the tube 21 by a pivot pin 57. The latch is unbalanced, that is, it is longer and therefore heavier at its outer end. The latch 56 is disposed in a horizontal position as indicated in Fig. 3, as the coupling 51 is being slid over the adapter tube 21, and thereafter the latch swings downwardly by the action of gravity, that is, the longer or outer end of the latch falls down of its own weight, as indicated in Fig. 4 thereby preventing the adapter and coupling from separating. The latch 56 has a flat end portion 58 which abuts the end of the tube 21 when the latch is in the horizontal position, and which prevents the latch from moving if it is attempted to swing it in a direction opposite to the downward direction as viewed in Figs. 3 and 4. The purpose of this is to prevent the operator from inserting the drain assembly into the curing bag inlet in such position that the hose 23 curves upwardly toward the top of the bag instead of downwardly. If the operator inserts the assembly correctly so that the hose is directed downwardly within the curing bag, the latch 56 will fall down into locking position automatically when the adapter tube 21 is passed through the port 50 in the coupling 51. If the assembly is inserted incorrectly with the hose directed upwardly, the outer end of the latch cannot fall or be moved downwardly into locking position, because the flat portion 58 abuts the end of the tube 21, so that the operator is warned of the error and knows that he must turn the insert tube assembly around to properly position it. In other words, the latch mechanism acts as a signal to the operator.

In operation, the curing bag 10, in a deflated condition and containing no insert tube 20, is inserted in the tire casing 35 as the latter is being shaped in the usual vacuum shaping box. In the course of this operation the curing bag is very much twisted and is pushed roughly into place with a hydraulic plunger. When the bag 10 is inserted in the casing 32, the operator introduces the tip 24 of the insert tube assembly into the entrance passage 12 leading through the rim wall 11 and inlet stem 14, and slides the metal hose 23 and insert tube 20 inwardly through the passage 12 into operative position. As indicated previously, the hose 23 is capable of straightening out against the action of the spring 27 as the assembly is pushed through the passage 12. When the insert tube assembly is in proper position the transverse plate 48 on the insert tube 20 abuts the outer rim surface of the curing bag.

The tire casing and bag assembly, associated with the toe rings 45 and 46 is enclosed in the vulcanizing mold 40 and the adapter tube 21 on the outer end of the insert tube 20 is slid through the port 50 of the coupling 51 so that the opening 53 from the entrance passageway 22 is in communication with the chamber 54 within the coupling. When properly positioned, the latch 56 falls downwardly, as represented in Fig. 4, keeping the coupling on the adapter tube. In order to displace the greater part of the air from the interior of the bag, the manifold (not shown) to which the tube 55 is connected, is attached to a steam supply, and steam under pressure is introduced through the tube 55 into the chamber 54 in the coupling 51, whence it passes through the hole 53 in the adapter tube 21 into the passageway 22 of the insert tube 20, and through the flexible hose 23 into the curing bag. The steam is then vented, that is, the manifold is connected to an exhaust or drain, thereby blowing the major part of the air out of the bag. The manifold is then connected to a hot water supply, and hot water is introduced into the bag to effect vulcanization. At the same time, the mold 40 is heated externally by heating means contained within the pot heater (not shown) or other enclosing vulcanizing chamber, in the usual manner.

After a sufficient time has elapsed to permit complete vulcanization of the tire, drainage of the hot water out of the bag may be accomplished by connecting the supply manifold to a drain line. The hot water in the bag at this time is usually at a temperature in the neighborhood of 275° to 290° F., that is, the water is in a superheated condition, and when the bag is opened to the atmosphere some of the water therefore flashes into steam, thereby driving substantially all of the water out of the bag through the drain tube.

Complete drainage is insured because the tip 24 of the flexible hose 23 is maintained at the extreme bottom of the cavity 13 of the curing bag by the action of the strip spring 27 within the hose 23. Thus, as indicated in Fig. 4, the flexible hose 23 is made to assume a 90° downwardly and inwardly curved arc extending from the end of the horizontally disposed insert tube 20 and terminating in the vertically disposed tip member 24, the terminal face of which bears against the bottom of the curing bag cavity.

After the bag is drained, the mold may be opened and the insert tube 20, together with the flexible hose 23, may be withdrawn from the resilient stem 14 of the curing bag before the curing bag is extracted from the cured tire casing for re-use. The foregoing cycle may be repeated until the bag has deteriorated from repeated exposure to vulcanizing conditions, to the point where the bag is no longer useful.

The invention, as described, therefore provides a highly effective draining means that is convenient to use. Because of the way in which the spring loading directs the tip of the flexible drain hose downwardly, there is no tendency for the tip to become stuck in the opposite wall of the curing bag as the rigid insert tube is being slid into position within the resilient stem of the bag. Therefore insertion of the insert tube is accomplished with ease and there is no difficulty about bringing the tip of the hose to rest at the lowest point in the bag.

Because of the manner in which the spring positively directs the flexible drain hose into arcuate form the hose always assumes the maximum possible curvature, i. e. the hose curves until the adjacent sections of the spiral comprising the hose abut each other at the inner radius of the curve. Therefore, by selecting a hose of proper length, the normal position of the tip of the hose can be predetermined as desired so as to coincide with the lowest point in the bag. Usually the curing bag will be disposed horizontally, or nearly so, so that the insert tube passes into the bag in substantially a horizontal direction, and the of the flexible hose will be such that, under the influence of the internal spring, it makes a right angle turn downwardly with the inner tip of the hose in a vertical position at the bottom of the bag.

Since the spring positively directs the flexible drain hose to the lowest point in the bag, it is evident that the positioning of the end of the hose is quite independent of the force of gravity, that is, there is no necessity for the hose to be of sufficiently great bulk and length to extend to the bottom of the bag of its own weight. For this reason, the draining means described is especially adapted to use with curing bags of relatively small diameter, such as are used for passenger car size tires. With such small bags, the length of the arc from the center of the rim wall of the curing bag to the center of the bottom wall of the bag is relatively small, and the usual flexible tube, in such a short length, would not bend into the desired curve of its own weight. The use of resilient means for positively directing the drain tube avoids this difficulty.

Another advantage of the spring loaded drain hose in avoiding the use of heavy weights is that the hose assembly is readily made in a sufficiently small diameter to be passed through the passage in the rim wall of the curing bag and the resilient extension thereon as described. This type of draining device is therefore especially adapted to be removed from, and inserted in, the bag repeatedly.

Because the insert tube and drainer hose assembly is easily removed from the bag, there is no occasion for the assembly to be damaged when the curing bag is inserted in or removed from a tire casing. With a conventional rigidly attached drainer tube it frequently happens that either the drainer tube or the curing bag become damaged during bag insertion or removal, due to the drainer tube being pressed forcibly into the wall of the bag as the latter is twisted and pushed during such insertion and removal.

Since the drainer tube is readily removable it can be easily inspected for clogging or damage, and if necessary, is easily repaired or replaced. This is of course difficult or impossible with drainer tubes which are rigidly attached to the bag.

As a consequence of the foregoing advantages it has been found in actual factory practice that the invention makes it possible to use a curing bag for a greater number of curing cycles than have heretofore been considered practical. Consequently, the cost of manufacturing the tires has been reduced, since the curing bag represents an appreciable item of expense in tire manufacture. In one actual case, the conventional curing bags employed in a pot heater of vulcanizer averaged only 180 vulcanizing cycles before they had to be discarded, while the curing bag constructed according to the present invention was still giving satisfactory service at 250 cycles.

Having thus described my invention what I claim and desire to protect by Letters Patent is:

1. A curing bag assembly for manufacture of pneumatic tires comprising a hollow annular toroidal inflatable bag of extensible, resilient material, said bag having an inlet opening through its rim wall, an inwardly projecting stem of extensible resilient material extending into the interior of the bag from said opening, and having a passageway therethrough forming a continuation of said opening, said stem being integrally united with the wall of said bag, a slidable rigid insert tube extending through said passageway in fluid sealing contact with the walls thereof, a flexible metal hose secured to the inner end of said insert tube, said metal hose being slidable through said passageway, a strip of spring material disposed longitudinally within said metal hose and secured therein, said spring producing a 90° downward and inward curvature of said hose such that when said bag is disposed in a horizontal position the terminal end of the metal hose is positioned at the extreme bottom of the interior of the curing bag.

2. A curing bag and drainer assembly comprising in combination a curing bag having an internal resilient projecting stem extending into the interior of the bag from the rim wall thereof, said stem and wall having a passageway therethrough, a flexible tube slidably insertable through said passageway in fluid sealing engagement therewith, said tube being bendable into a definite arcuate form, and said tube being of such length that it extends to the bottom of the bag when in said arcuate form, and a spring for yieldingly bending the tube into said arcuate form.

3. A curing bag and drain assembly comprising in combination a curing bag having an internal resilient projecting stem extending into the interior of the bag from the rim wall thereof, said stem and wall having a passageway therethrough, a flexible tube slidably insertable through said passageway in fluid sealing engagement therewith, said tube having a normal curvature and length such that it extends to the bottom of the bag, and means for yieldingly maintaining said tube in said normal curvature, whereby the tube may be straightened out while being inserted in or removed from said passageway.

4. A curing bag and drainer assembly comprising in combination a curing bag having an internal integral resilient projecting stem extending into the bag from the inner surface of the rim wall of the bag, said stem and wall having a passageway therethrough, a flexible tube slidably insertable through said passageway in fluid sealing engagement therewith, and a spring in said tube for directing the inner end of the tube to the bottom of the bag.

References Cited in the file of this patent

UNITED STATES PATENTS

| Number | Name | Date |
|---|---|---|
| 865,355 | Callmann et al. | Sept. 10, 1907 |
| 1,041,216 | Woods | Oct. 15, 1912 |
| 1,694,872 | Van Rennes | Dec. 11, 1928 |
| 1,798,210 | Laursen | Mar. 31, 1931 |
| 2,277,864 | Horvath | Mar. 31, 1942 |
| 2,302,754 | Eakin | Nov. 24, 1942 |
| 2,530,055 | Green | Nov. 14, 1950 |